United States Patent
Yoshitomi

(10) Patent No.: US 11,450,868 B2
(45) Date of Patent: Sep. 20, 2022

(54) FUEL CELL SYSTEM

(71) Applicant: HONDA MOTOR CO., LTD., Tokyo (JP)

(72) Inventor: Ryoichi Yoshitomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 17/092,617

(22) Filed: Nov. 9, 2020

(65) Prior Publication Data

US 2021/0143453 A1     May 13, 2021

(30) Foreign Application Priority Data

Nov. 11, 2019    (JP) .............................. JP2019-203919

(51) Int. Cl.
*H01M 8/04119* (2016.01)
*H01M 8/04007* (2016.01)
*B60L 50/72* (2019.01)

(52) U.S. Cl.
CPC ......... *H01M 8/04134* (2013.01); *B60L 50/72* (2019.02); *H01M 8/04067* (2013.01); *H01M 8/04164* (2013.01); *H01M 2250/20* (2013.01)

(58) Field of Classification Search
CPC .... B60L 50/71; B60L 50/72; H01M 2250/20; H01M 8/04067; H01M 8/04134; H01M 8/04141; H01M 8/04164; H01M 8/04201; H01M 8/1007; Y02T 90/40
See application file for complete search history.

(56) References Cited

U.S. PATENT DOCUMENTS

| 2007/0134526 A1* | 6/2007 | Numao ............... H01M 8/1007 429/414 |
| 2019/0036139 A1* | 1/2019 | Tsubouchi ........ H01M 8/04104 |
| 2019/0260059 A1* | 8/2019 | Mizusaki .......... H01M 8/04089 |

FOREIGN PATENT DOCUMENTS

JP     2013-004352 A    1/2013

* cited by examiner

*Primary Examiner* — Adam A Arciero
(74) *Attorney, Agent, or Firm* — Carrier Blackman & Associates, P.C.; William D. Blackman; Joseph P. Carrier

(57) ABSTRACT

A fuel cell system includes a fuel cell stack, hydrogen gas system auxiliary devices disposed outside the fuel cell stack, and air system auxiliary devices disposed adjacent to the hydrogen gas system auxiliary devices. The hydrogen gas system auxiliary devices include injectors, upstream side auxiliary devices provided on the upstream side of the injectors in the flow direction of hydrogen gas, and downstream side auxiliary devices provided on the downstream side of the injectors in the flow direction of the hydrogen gas. The upstream side auxiliary devices are disposed at positions farther away from the air system auxiliary devices than the downstream side auxiliary devices.

8 Claims, 5 Drawing Sheets

FUEL CELL SYSTEM

CROSS-REFERENCE TO RELATED APPLICATION

This application is based upon and claims the benefit of priority from Japanese Patent Application No. 2019-203919 filed on Nov. 11, 2019, the contents of which are incorporated herein by reference.

BACKGROUND OF THE INVENTION

Field of the Invention

The present invention relates to a fuel cell system including a fuel cell stack, a hydrogen gas system auxiliary device, and an air system auxiliary device.

Description of the Related Art

A fuel cell system includes a fuel cell stack, a hydrogen gas system auxiliary device for supplying/discharging a hydrogen gas to/from the fuel cell stack, and an air system auxiliary device for supplying/discharging the air to/from the fuel cell stack. In the case where the fuel cell system is mounted in a fuel cell vehicle, it is required to suitably dispose the fuel cell stack and auxiliary devices in a limited space of a motor room.

For example, a fuel cell system disclosed in Japanese Laid-Open Patent Publication No. 2013-004352 is directed to achieve a compact structure where hydrogen gas system auxiliary devices such as a hydrogen pump, a gas liquid separator, and an injector are attached to positions adjacent to an end plate disposed at one end of the fuel cell stack.

SUMMARY OF THE INVENTION

In this regard, in the fuel cell system, the pressure of the hydrogen gas is low at some positions of the hydrogen gas system auxiliary devices and the pressure of the hydrogen gas is high at other positions of the hydrogen gas system auxiliary devices, during operation, etc. of the fell cell stack. If the fuel cell system adopts a layout where a heavy object (e.g., a humidifier as an air system auxiliary device) is disposed adjacent to a position where the pressure of the hydrogen gas is high for size reduction, in the case where the fuel cell vehicle receives a large load such as an impact, the auxiliary devices which are present at such a position where the pressure of the hydrogen gas is high may be damaged by movement of the heavy object.

The present invention relates to the above fuel cell system, and an object of the present invention is to provide a fuel cell system in which, even if the fuel cell system receives a load, it is possible to suitably protect auxiliary devices which are present at positions where the pressure of the hydrogen gas is high.

In order to achieve the above object, according to an aspect of the present invention, a fuel cell system is provided. The fuel cell system includes a fuel cell stack, a hydrogen gas system auxiliary device disposed outside the fuel cell stack, and an air system auxiliary device disposed adjacent to the hydrogen gas system auxiliary device. The hydrogen gas system auxiliary device includes an injector, an upstream side auxiliary device provided on the upstream side of the injector in the flow direction of hydrogen gas, and a downstream side auxiliary device provided on the downstream side of the injector in the flow direction of the hydrogen gas. The upstream side auxiliary device is disposed at a position farther away from the air system auxiliary device than the downstream side auxiliary device.

In the fuel cell system, the upstream side auxiliary device is disposed at a position farther away from the air system auxiliary device than the downstream side auxiliary device. With such a configuration, when the air system auxiliary device receives a large load toward the hydrogen gas system auxiliary device, the air system auxiliary device is initially brought into contact with the injector or the downstream side auxiliary device. Therefore, it is possible to suitably protect the upstream side auxiliary device having a pressure of hydrogen gas that is higher than a pressure of hydrogen gas in the downstream side auxiliary device. That is, even if the fuel cell system receives a large load, it is possible to suppress damage on the upstream side auxiliary device.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of the present invention will be described in detail with reference to the accompanying drawings.

Figure 1:
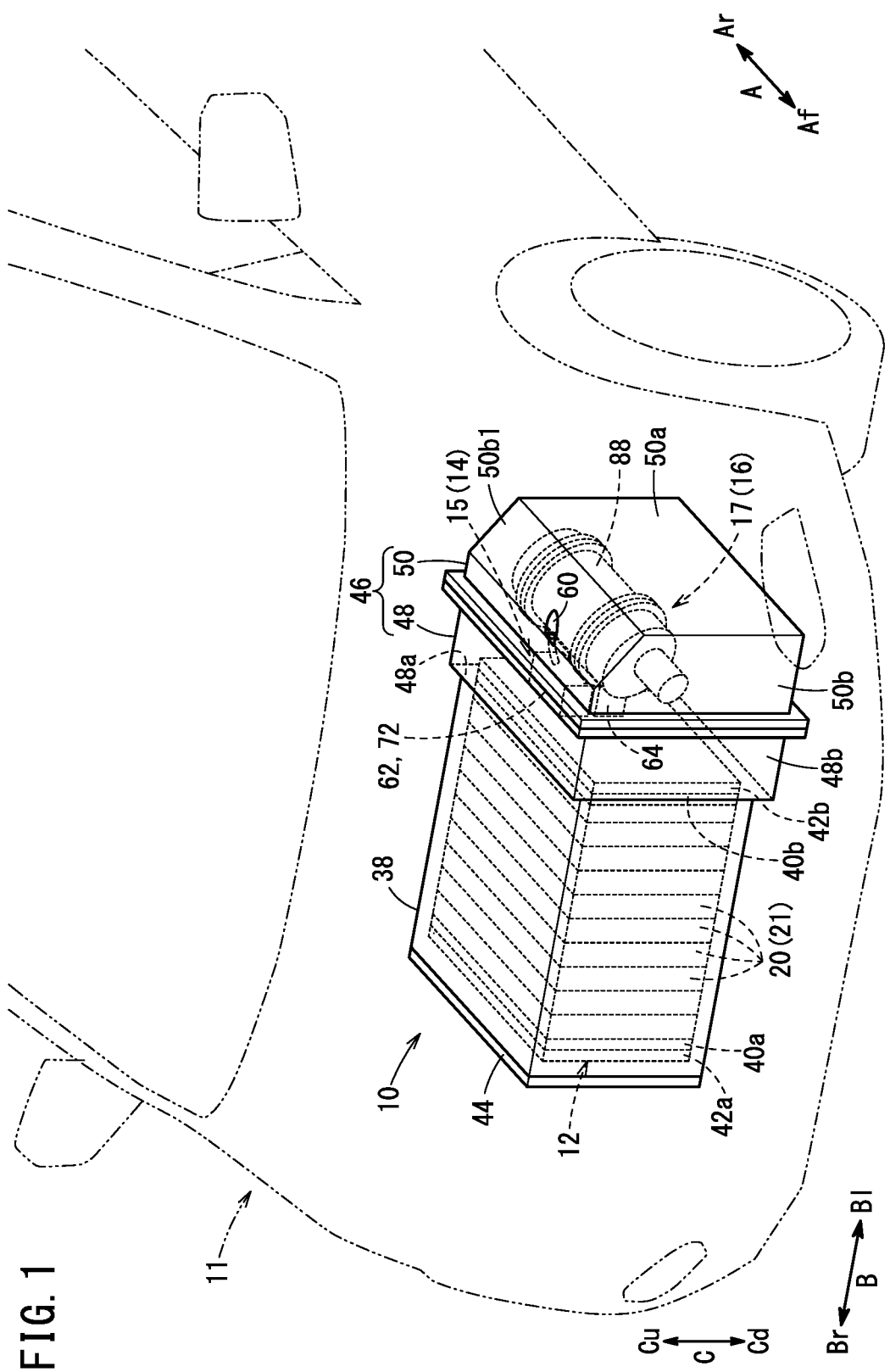
FIG. 1 is a perspective view showing a motor room of a fuel cell vehicle equipped with a fuel cell system according to an embodiment of the present invention.
Figure 2:
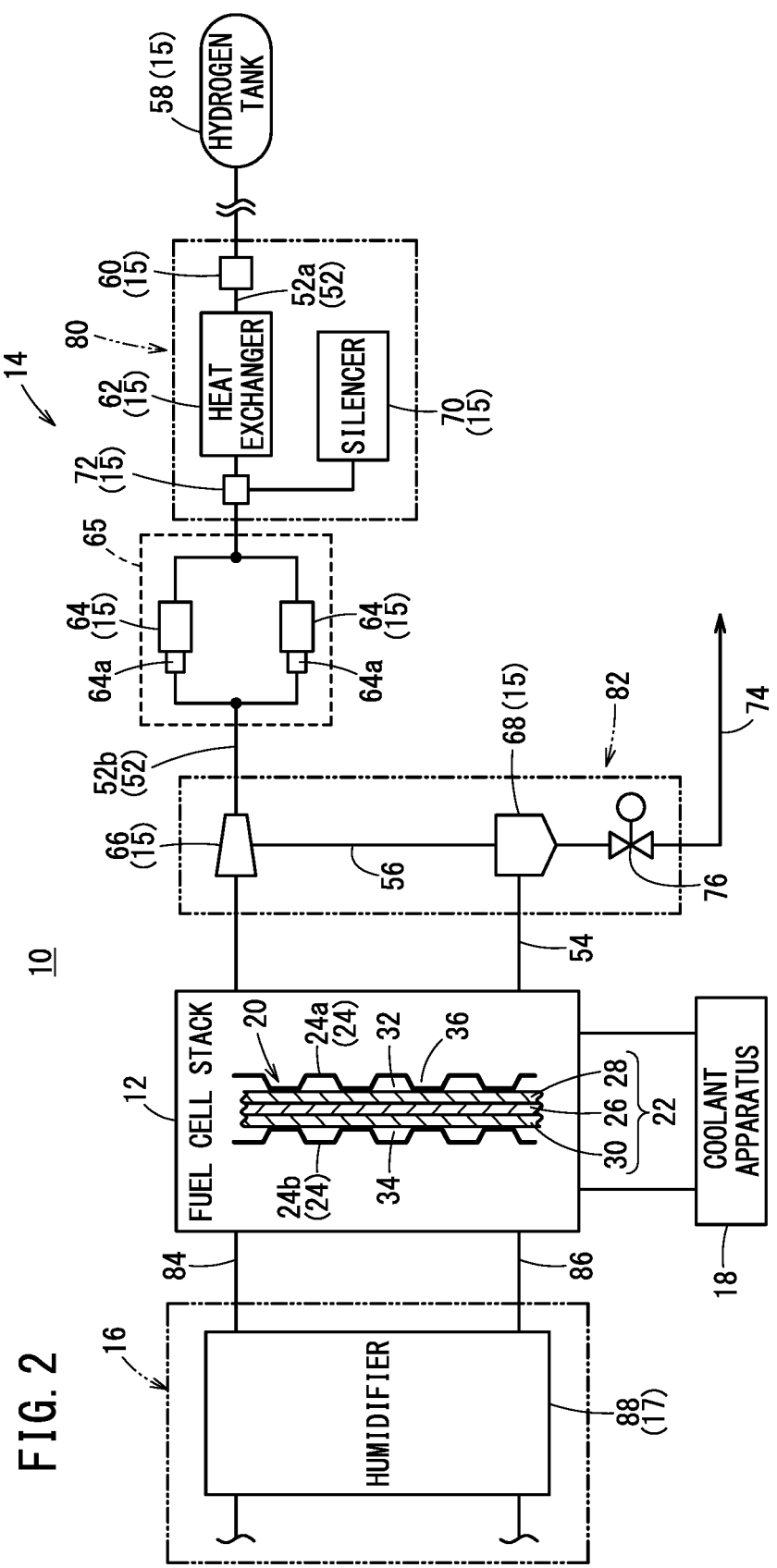
FIG. 2 is a diagram showing a structure of the fuel cell system.

As shown in FIG. 1, a fuel cell system 10 according to the embodiment of the present invention includes a fuel cell stack 12, an anode system apparatus 14, a cathode system apparatus 16, and a coolant apparatus 18 (see FIG. 2). The fuel cell system 10 is mounted in a motor room (front room) of a fuel cell vehicle 11 (fuel cell automobile: hereinafter simply referred to as the "vehicle 11"). The fuel cell system 10 supplies electrical energy produced in power generation of the fuel cell stack 12 to a battery, a motor, etc. (not shown) to enable travel of the vehicle 11.

The fuel cell stack 12 includes a plurality of power generation cells 20 which perform power generation by electrochemical reaction of hydrogen gas (fuel gas, anode gas) and air (oxygen-containing gas, cathode gas). In the state where the fuel cell stack 12 is mounted in the vehicle 11, the plurality of power generation cells 20 are stacked together in the vehicle width direction (indicated by the arrow B) to form a stack body 21 in a manner that the electrode surfaces are oriented upright. The plurality of power generation cells 20 may be stacked together in a vehicle length direction (indicated by the arrow A) or in the gravity direction (indicated by the arrow C) of the vehicle 11.

As shown in FIG. 2, each of the power generation cells 20 includes a membrane electrode assembly 22 (hereinafter referred to as the "MEA 22"), and two separators 24 (a first separator 24*a* and a second separator 24*b*) sandwiching the MEA 22. The MEA 22 includes an electrolyte membrane 26 (e.g., solid polymer electrolyte membrane (cation ion exchange membrane)), and an anode 28 provided on one surface of the electrolyte membrane 26, and a cathode 30 provided on the other surface of the electrolyte membrane 26. An anode gas flow field 32 as a passage of a hydrogen gas and a cathode gas flow field 34 as a passage of the air are formed in surfaces of the first separator 24*a* and the second separator 24*b* which face the MEA 22. Further, when the plurality of power generation cells 20 are stacked together, a coolant flow field 36 as a passage of the coolant is formed on surfaces of the first and second separators 24*a*, 24*b* which face each other.

Further, the fuel cell stack 12 includes a plurality of unillustrated fluid passages (anode gas passages, cathode gas passages, and coolant passages) as passages for allowing the hydrogen gas, the air, and the coolant to flow in the stacking direction of the plurality of power generation cells 20. In the stack body 21, the anode gas passages are connected to the anode gas flow field 32, the cathode gas passages are connected to the cathode gas flow field 34, and the coolant passages are connected to the coolant flow field 36.

The hydrogen gas supplied to the fuel cell stack 12 flows through the anode gas passage (anode gas supply passage), and flows into the anode gas flow field 32. The hydrogen gas used in power generation at the anode 28 (containing unreacted hydrogen) flows from the anode gas flow field 32 into the anode gas passage (anode gas discharge passage), and is discharged to the outside of the fuel cell stack 12.

The air supplied to the fuel cell stack 12 flows through the cathode gas passage (cathode gas supply passage), and flows into the cathode gas flow field 34. The air used in power generation at the cathode 30 flows from the cathode gas flow field 34 into the cathode gas passage (cathode gas discharge passage), and the air is discharged to the outside of the fuel cell stack 12.

The coolant supplied to the fuel cell stack 12 flows through the coolant passage (coolant supply passage) into the coolant flow field 36. After the coolant cools the power generation cells 20, the coolant is discharged from the coolant flow field 36 into the coolant passage (coolant discharge passage), and the coolant is discharged to the outside of the fuel cell stack 12.

Further, in the fuel cell stack 12 according to the embodiment of the present invention, as shown in FIG. 1, the stack body 21 is accommodated in a rectangular cylindrical stack case 38. At one end of the stack body 21 in a direction indicated by an arrow B (on a side indicated by an arrow Br), a terminal plate 40*a* and an insulating plate 42*a* are disposed in this order toward the outside. The terminal plate 40*a* and the insulating plate 42*a* are accommodated in the stack case 38. An end plate 44 closing an internal space of the stack case 38 is attached to the stack case 38 on the side indicated by the arrow Br. The end plate 44 applies a tightening load to the power generation cells 20 in the stacking direction.

At the other end of the stack body 21 in the direction indicated by the arrow B (on a side indicated by an arrow Bl), a terminal plate 40*b* and an insulating plate 42*b* are disposed in this order toward the outside. The terminal plate 40*b* and the insulating plate 42*b* are accommodated in the stack case 38. An auxiliary device case 46 for closing an accommodation space of the stack case 38 is attached to the stack case 38 on the side indicated by the arrow Bl (at a position adjacent to the stack case 38 in the horizontal direction).

The auxiliary device case 46 is a casing for accommodating and protecting auxiliary devices and pipes of the fuel cell system 10 partially. The auxiliary device case 46 includes a first case member 48 having a recessed shape and being joined to the stack case 38, and a second case member 50 having a recessed shape and being joined to the first case member 48.

Figure 3:
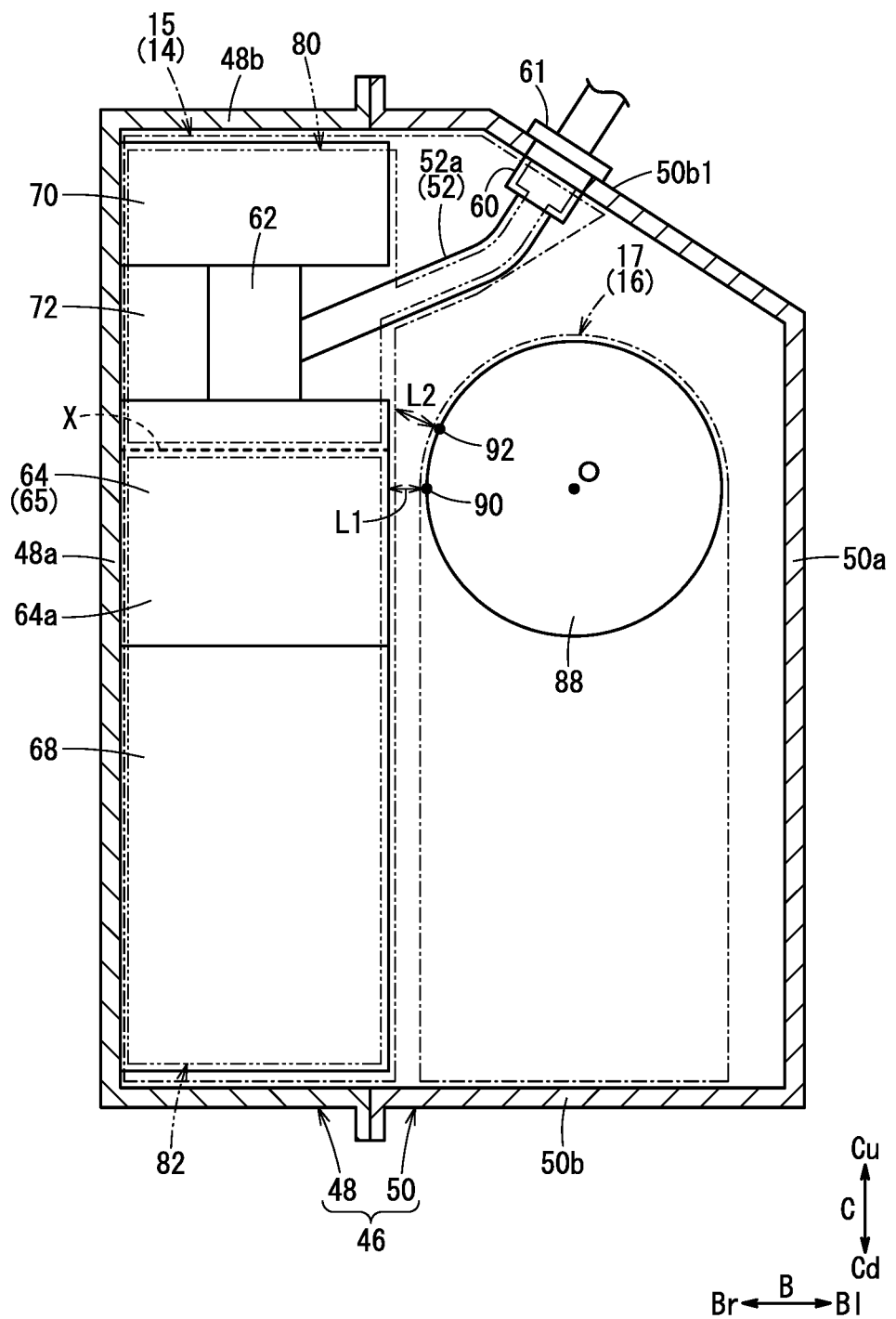
FIG. 3 is a cross sectional view taken along a vehicle width direction, schematically showing a hydrogen gas system auxiliary device and an air system auxiliary device accommodated in an auxiliary device case.

The first case member 48 includes an attachment wall 48*a* joined to the stack case 38 using bolts, and a peripheral wall 48*b* continuous with outer periphery of the attachment wall 48*a* and protruding in the direction indicated by the arrow Bl (see also FIG. 3). The attachment wall 48*a* functions as an end plate for applying a tightening load to the stack body 21 of the power generation cells 20 in the stacking direction. A plurality of holes (not shown) connected to the anode gas passages, cathode gas passages, and coolant passages of the power generation cells 20 are formed in the attachment wall 48*a*. Pipes (not shown) as passages of the hydrogen gas, the air, and the coolant are connected to the holes, respectively.

The second case member 50 includes a side wall 50*a* which is present at a position protruding farthest from the fuel cell stack 12, and a peripheral wall 50*b* which is continuous with an outer marginal portion of the side wall 50*a* and protruding in the direction indicated by the arrow Br (see also FIG. 3). The first case member 48 and the second case member 50 are assembled together by joining flanges provided at protruding ends of the peripheral wall 48*b* and the peripheral wall 50*b* together.

Further, the auxiliary device case 46 has, provided therein, hydrogen gas system auxiliary devices 15 of the anode system apparatus 14 and air system auxiliary devices 17 of the cathode system apparatus 16. The hydrogen gas system auxiliary devices 15 are provided mainly at positons adjacent to the attachment wall 48*a* in the auxiliary device case 46 (on the side indicated by the arrow Br). The air system auxiliary devices 17 are provided mainly at positions adjacent to the hydrogen gas system auxiliary devices 15 in the auxiliary device case 46 (on the side indicated by the arrow Bl) (see also FIG. 3).

As shown in FIG. 2, the anode system apparatus 14 includes a hydrogen gas supply pipe 52 (a series of pipes provided on the hydrogen gas supply side) for supply the hydrogen gas to the fuel cell stack 12, and a hydrogen gas discharge pipe 54 for discharging the hydrogen gas used in power generation in the fuel cell stack 12. Further, a circulation pipe 56 for returning the unreacted hydrogen contained in the hydrogen gas in the hydrogen gas discharge pipe 54 to the hydrogen gas supply pipe 52 is connected between the hydrogen gas supply pipe 52 and the hydrogen gas discharge pipe 54.

Examples of the hydrogen gas system auxiliary devices 15 of the anode system apparatus 14 include a hydrogen tank 58, a joint mechanism 60, a heat exchanger 62, a plurality of injectors 64, an ejector 66, and a gas liquid separator 68. Further, the hydrogen gas system auxiliary devices 15 include a silencer 70 for suppressing operating noises of the injector 64.

The hydrogen tank 58 is connected to one end of the hydrogen gas supply pipe 52 for supplying high-pressure hydrogen gas stored in the hydrogen tank 58 to the hydrogen gas supply pipe 52. The hydrogen tank 58 is provided at a predetermined position of the vehicle 11 (e.g., behind and below the rear sheets of the vehicle 11).

The joint mechanism 60 is a structural unit which connects a portion of the hydrogen gas supply pipe 52 that lies outside the auxiliary device case 46 and extends from the hydrogen tank 58 and a portion of the hydrogen gas supply pipe 52 that lies inside the auxiliary device case 46, for allowing the hydrogen gas to flow through the hydrogen gas supply pipe 52. A portion (upstream side pipe 52a) of the hydrogen gas supply pipe 52 that lies adjacent to at least the joint mechanism 60 outside the auxiliary device case 46 is an elastically deformable (flexible) resin pipe. A portion (upstream side pipe 52a) of the hydrogen gas supply pipe 52 that is provided so as to extend from the joint mechanism 60 to the inside of the auxiliary device case 46 is a hard metal pipe. There is provided a grommet 61 between the auxiliary device case 46 and the joint mechanism 60.

The heat exchanger 62 heats the hydrogen gas supplied from the hydrogen tank 58. For example, water (coolant, etc.) which has flowed through the fuel cell stack 12 is used as a heating medium which performs heat exchange with the hydrogen gas in the heat exchanger 62.

The plurality of injectors 64 (two, in the illustrated embodiment) form a series of injector units 65, and inject the hydrogen gas supplied from the upstream side in the hydrogen gas supply pipe 52 toward the downstream side at a predetermined flow rate and at a predetermined injection pressure. The hydrogen gas supply pipe 52 has a branch point(s) and a meeting point(s) in correspondence with the number of injectors 64. The injector unit 65 has, on the upstream side, a pipe unit 72 for branching the hydrogen gas supply pipe 52. It is noted that the anode system apparatus 14 may include one injector 64, or three or more injectors 64.

The ejector 66 sucks the hydrogen gas from the circulation pipe 56 and supplies the hydrogen gas to the fuel cell stack 12 on the downstream side, by negative pressure generated by the hydrogen gas injected from the injector unit 65.

The gas liquid separator 68 is provided between the hydrogen gas discharge pipe 54 and the circulation pipe 56. The gas liquid separator 68 separates liquid water contained in the hydrogen gas discharged from the fuel cell stack 12 (water produced during power generation) from the hydrogen gas. A discharge pipe 74 for discharging the separated liquid water and the reactant gases (hydrogen gas and/or the nitrogen gas) is connected to the gas liquid separator 68. The discharge pipe 74 is provided with a valve 76 (drain valve) which is opened/closed at suitable timing.

It should be noted that the hydrogen gas system auxiliary devices 15 may include a pump for circulating hydrogen gas to the hydrogen gas supply pipe 52, e.g., at a position along the circulation pipe 56, and may include a valve (reed valve) for allowing the hydrogen gas to flow in one direction.

In the anode system apparatus 14, the pressure of the hydrogen gas flowing inside the anode system apparatus 14 changes at the plurality of injectors 64 (injector units 65) as borders. That is, the hydrogen gas flowing through the hydrogen gas supply pipe 52 on the upstream side of each injector 64 (hereinafter referred to as the upstream side pipe 52a) has a relatively high pressure (which is lower than the pressure of the hydrogen gas in the hydrogen tank 58, and thus, will be referred to as the "middle pressure"). Hereinafter, the hydrogen gas system auxiliary devices 15 which are arranged inside the auxiliary device case 46 and on the upstream side of each injector 64 in the flow direction of the hydrogen gas will be referred to as the upstream side auxiliary devices 80. Examples of the upstream side auxiliary devices 80 include the joint mechanism 60, the heat exchanger 62, the silencer 70, and the pipe unit 72.

On the other hand, the pressure of the hydrogen gas flowing through the hydrogen gas supply pipe 52 on the downstream side of the injectors 64, the hydrogen gas discharge pipe 54, and the circulation pipe 56 is lower than the pressure of the hydrogen gas flowing though the upstream side pipe 52a. Hereinafter, the hydrogen gas system auxiliary devices 15 disposed on the downstream side of injectors 64 in the flow direction of the hydrogen gas will be referred to as the downstream side auxiliary devices 82. Examples of the downstream side auxiliary devices 82 include the ejector 66, the gas liquid separator 68, and the valve 76. The ejector 66, the gas liquid separator 68, and the valve 76 are accommodated in the auxiliary device case 46.

Further, the cathode system apparatus 16 of the fuel cell system 10 includes an air supply pipe 84 for supplying the air to the fuel cell stack 12 and an air discharge pipe 86 for discharging the air (containing the unreacted oxygen-containing gas) consumed in power generation of the fuel cell stack 12. Examples of the air system auxiliary devices 17 of this cathode system apparatus 16 include a humidifier 88 shown in FIG. 2. Further, though not shown, in addition to the humidifier 88, the air system auxiliary devices 17 disposed outside the auxiliary device case 46 include a compressor, intercooler, etc. The air system auxiliary devices 17 disposed inside the auxiliary device case 46 include a cathode system gas liquid separator, a valve unit, etc.

The humidifier 88 is connected between the air supply pipe 84 and the air discharge pipe 86. The humidifier 88 suitably humidifies the air flowing through the air supply pipe 84 using water (water produced during power generation) contained in the air flowing through the air discharge pipe 86. The humidifier 88 is accommodated in the auxiliary device case 46 (see FIG. 1).

Next, the system structure (layout) when the hydrogen gas system auxiliary devices 15 and the air system auxiliary devices 17 are provided in the auxiliary device case 46 will be described.

Figure 4:
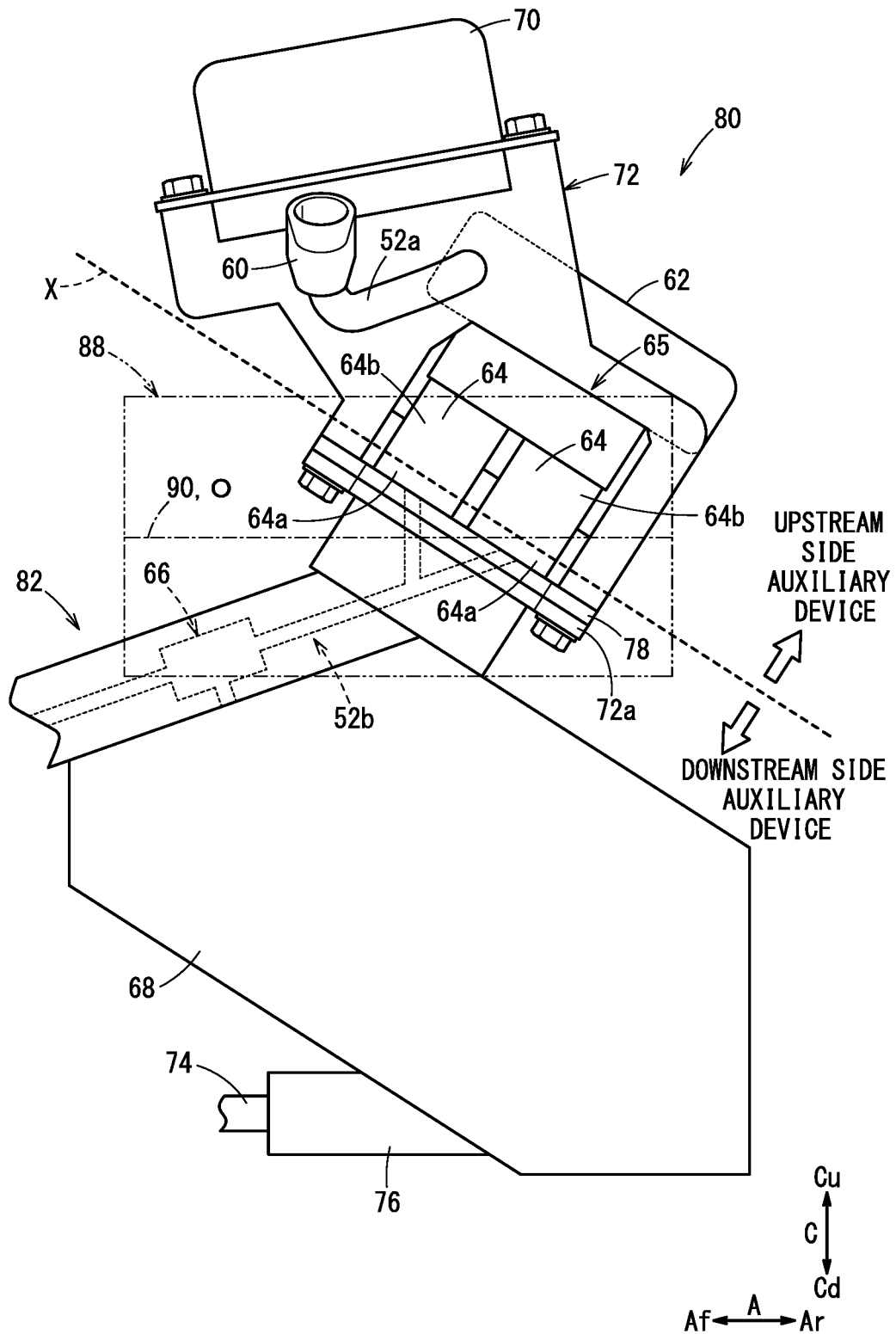
FIG. 4 is a diagram schematically showing a hydrogen gas system auxiliary device as viewed in a vehicle width direction.

As shown in FIGS. 3 and 4, as the hydrogen gas system auxiliary devices 15, the upstream side auxiliary devices 80 (the joint mechanism 60, the heat exchanger 62, the silencer 70, and the pipe unit 72), the plurality of injectors 64 (injector units 65), and the downstream side auxiliary devices 82 (the ejector 66, the gas liquid separator 68, and the valve 76) are disposed in the auxiliary device case 46. Each of the hydrogen gas system auxiliary devices 15 is fixed to the first case member 48 of the auxiliary device case 46 directly or indirectly (through other auxiliary devices). That is, the hydrogen gas system auxiliary devices 15 are collectively provided in the auxiliary device case 46 on the side indicated by the arrow Br.

More specifically, the pressure of the hydrogen gas changes at the injector units 65 (plurality of injectors 64) serving as borders (pressure changing points), and the injector units 65 are provided at substantially middle positions in the auxiliary device case 46 in the gravity direction indicated by the arrow C. Then, the upstream side auxiliary devices 80 are provided above the injector units 65 in the gravity direction (on the side indicated by an arrow Cu), and the downstream side auxiliary devices 82 are provided below the injector units 65 in the gravity direction (on the side indicated by an arrow Cd).

As shown in FIG. 4, the injector units 65 are disposed in an orientation where the plurality of injectors 64 are disposed at an angle (i.e., inclined) by attachment to the auxiliary device case 46. That is, the hydrogen gas injection part (outlet part) of the injectors 64 is positioned on the side indicated by the arrow Af and on the side indicated by the arrow Cd of the hydrogen gas inlet part (upstream part 64b) of each injector 64. In the embodiment of the present invention, a downstream part 64a of the injector 64 corresponds to the hydrogen gas injection part (outlet part), and bold lines in FIGS. 3 and 4 indicate the border X between this downstream part 64a and the upstream part 64b of the injector 64. Further, the hydrogen gas supply pipe 52 (downstream side pipe 52b) on the downstream side of each injector 64 extends obliquely toward the side indicated by the arrow Af and the side indicated by the arrow Cd.

The gas liquid separator 68 of the downstream side auxiliary devices 82 is continuous with the downstream side pipe 52b, and is fixed to the attachment wall 48a. The valve 76 is directly attached to the gas liquid separator 68 on the side indicated by the arrow Af and the on the side indicated by the arrow Cd, and the valve 76 is provided with the discharge pipe 74. Further, the ejector 66 is provided inside a portion of the downstream side pipe 52b that is connected to the gas liquid separator 68.

In the meanwhile, the upper side of the inclined injector units 65 (on the side indicated by the arrow Cu) is coupled to the pipe unit 72 of the upstream side auxiliary devices 80. The pipe unit 72 is provided at a position adjacent to the attachment wall 48a (on the side indicated by the arrow Br) inside the auxiliary device case 46. This pipe unit 72 fixes each of the auxiliary devices that are present between the upstream side pipe 52a and the plurality of injectors 64, and the pipe unit 72 distributes the hydrogen gas in a branched manner to thereby cause the hydrogen gas to flow into the plurality of injectors 64. The pipe unit 72 is formed to be hard (i.e., to have a predetermined rigidity).

The pipe unit 72 includes a fixing plate 72a for connecting the injector units 65 (plurality of injectors 64). The fixing plate 72a is fixed to a flange 78 of the injector units 65 supporting the downstream part 64a of the plurality of injectors 64. In a state where the fixing plate 72a and the flange 78 are fixed together, the fixing plate 72a and the flange 78 are configured to be harder than the humidifier 88.

The heat exchanger 62 of the upstream side auxiliary devices 80 is attached to the pipe unit 72 on the side indicated by the arrow Bl. Further, the silencer 70 of the upstream side auxiliary devices 80 is coupled to the upper side of the pipe unit 72 (indicated by the arrow Cu), and disposed close to the upper part of the auxiliary device case 46.

The upstream side pipe 52a made up of a metal pipe is coupled to the side surface of the pipe unit 72 on the side indicated by the arrow Bl through the heat exchanger 62. The upstream side pipe 52a extends from the heat exchanger 62 toward the side indicated by the arrow Bl and the side indicated by the arrow Cu, and is connected to the joint mechanism 60 fixed to the peripheral wall 50b of the second case member 50. The upstream side pipe 52a is disposed at a position farther away from the air system auxiliary device 17 than the injector unit 65.

The joint mechanism 60 is fixed to an inner surface of the wall 50b1 inclined in the peripheral wall 50b at an upper part (on the side indicated by the arrow Cu) of the auxiliary device case 46. That is, though the joint mechanism 60 is located closer to the arrow Bl side than the other hydrogen gas system auxiliary devices 15, the joint mechanism 60 is positioned farther away from the air system auxiliary devices 17 than the injector units 65.

Then, the air system auxiliary devices 17 are positioned adjacent to the above hydrogen gas system auxiliary devices 15 in the direction indicated by the arrow Bl. Among the air system auxiliary devices 17, the humidifier 88 is disposed at the uppermost position (on the side indicated by the arrow Cu) in the layout of the air system auxiliary devices 17. Further, the humidifier 88 includes an adjacent part 90 which is positioned closest to the hydrogen gas system auxiliary devices 15, in the air system auxiliary devices 17. The adjacent part 90 is disposed in a manner to face the downstream part 64a of the plurality of injectors 64 (injector units 65). That is, the downstream part 64a of the injector units 65 and the adjacent unit 90 are disposed at substantially the same height position in the direction indicated by the arrow C. For example, this adjacent part 90 and the center of gravity O of the cylindrical humidifier 88 are substantially at the same height position (level position) in the direction indicated by the arrow C. The center of gravity O of the humidifier 88 extends in the vehicle length direction (in the direction indicated by the arrow A).

In the fuel cell system 10 disposed as described above, the interval L1 between the adjacent part 90 and the downstream part 64a of the plurality of injectors 64 is the minimum distance between the hydrogen gas system auxiliary devices 15 and the air system auxiliary devices 17. On the other hand, the interval L2 from a portion of the humidifier 88 that is closest to the upstream side auxiliary devices 80 (adjacent part 92 above the adjacent part 90 (on the side indicated by the arrow Cu)) to the upstream side auxiliary devices 80 is larger than the interval L1.

The fuel cell system 10 according to the embodiment of the present invention basically has the above structure. Hereinafter, operation of the fuel cell system 10 will be described below.

As shown in FIG. 2, during operation of the fuel cell system 10 (during power generation of the fuel cell stack 12), the anode system apparatus 14 supplies the hydrogen gas to the fuel cell stack 12, and discharges the gas from the fuel cell stack 12. Specifically, the hydrogen gas discharged from the hydrogen tank 58 flows, via the hydrogen gas supply pipe 52, through the joint mechanism 60, the heat exchanger 62, the plurality of injectors 64, and the ejector 66 in this order. The hydrogen gas flows through the upstream side of the plurality of injectors 64 (i.e., through the upstream side auxiliary devices 80) under the middle pressure, and flows through the downstream side of the plurality of injectors 64 (i.e., through the downstream side auxiliary devices 82) under the low pressure.

The hydrogen gas discharged from the fuel cell stack 12 flows into the gas liquid separator 68 through the hydrogen gas discharge pipe 54, and liquid water contained in the hydrogen gas is separated in the gas liquid separator 68. Part of the hydrogen gas subjected to such separation circulates into the hydrogen gas supply pipe 52 through the circulation pipe 56. In the meanwhile, the remaining hydrogen gas is discharged from the gas liquid separator 68 into the discharge pipe 74 together with the liquid water.

Further, in the fuel cell system 10, during power generation of the fuel cell stack 12, the cathode system apparatus 16 supplies the air to the fuel cell stack 12, and discharges the consumed air from the fuel cell stack 12. At this time, the humidifier 88 of the air system auxiliary devices 17 humidifies the air to be supplied to the fuel cell stack 12, by using the consumed air containing the water.

Each of the power generation cells 20 in the fuel cell stack 12 performs power generation consuming the hydrogen supplied to the anode 28 and the air supplied to the cathode 30. Further, in the fuel cell system 10, during power generation of the fuel cell stack 12, the coolant apparatus 18 is operated to circulate the coolant to cool the fuel cell stack 12.

Figure 5:
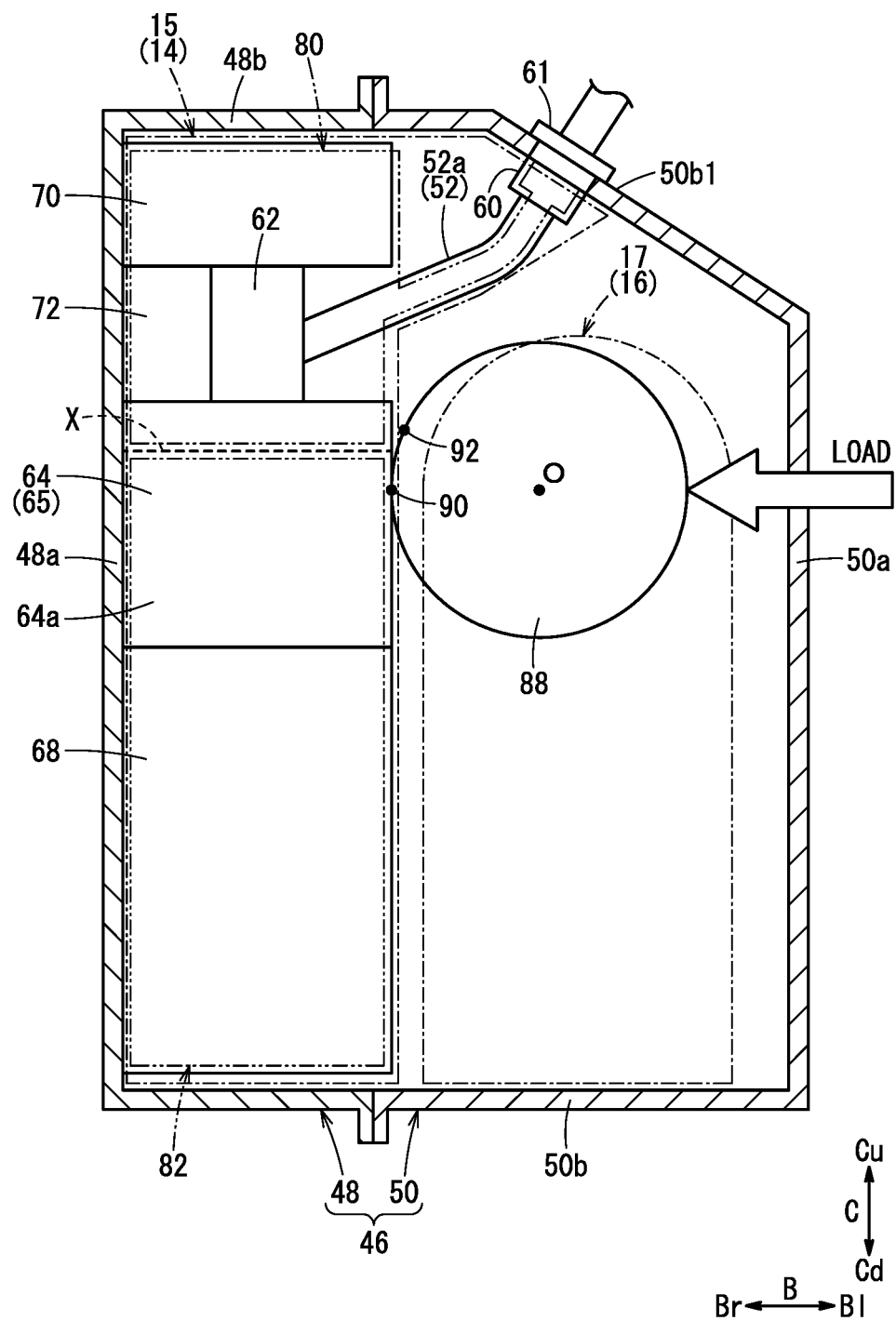
FIG. 5 is a cross sectional view showing behavior of the hydrogen gas system auxiliary device and the air system auxiliary device when a load is applied to the hydrogen gas system auxiliary device and the air system auxiliary device.

Hereinafter, behavior of the auxiliary devices in the auxiliary device case 46 in the case where an impact is applied to the vehicle 11 from the side indicated by the arrow Bl to the side indicated the arrow Br will be described with reference to FIG. 5. When the impact occurs, the load in the direction indicated by the arrow Br is transmitted from the side wall 50a of the auxiliary device case 46 on the side indicated by the arrow Bl to the air system auxiliary devices 17. As a result, the air system auxiliary devices 17 containing the humidifier 88 move toward the hydrogen gas system auxiliary devices 15.

As described above, the downstream parts 64a of the plurality of injectors 64 are provided at the same height position as the adjacent part 90 of the humidifier 88. Therefore, as a result of movement of the humidifier 88 by application of the load in the direction indicated by the arrow Br, the humidifier 88 comes into contact with the downstream parts 64a, and then applies the load to the hydrogen gas system auxiliary devices 15. As a result, among the hydrogen gas system auxiliary devices 15, the downstream side auxiliary devices 82 where the low-pressure hydrogen gas flows may be subjected to deformation.

The load of the humidifier 88 in the direction indicated by the arrow Br is applied initially to the downstream side auxiliary devices 82, whereby the energy of the load is reduced. As a result, it is possible to suppress deformation due to interference with the upstream side auxiliary devices 80. That is, in the fuel cell system 10, the upstream side auxiliary devices 80 in which the middle-pressure hydrogen gas flows are provided at a position to which the load in the direction indicated by the arrow Br is not applied. In the structure, it is possible to suitably protect the upstream side auxiliary devices 80. In particular, when the humidifier 88 moves in the direction indicated by the arrow Br, the humidifier 88 contacts the flanges 78 of the injector units 65 having high rigidity. Therefore, in the fuel cell system 10, it is possible to suitably protect the whole of the hydrogen gas system auxiliary devices 15.

The present invention is not limited to the above embodiment. Various modifications may be made in line with the gist of the present invention. For example, the fuel cell system 10 has structure where the hydrogen gas system auxiliary devices 15 and the air system auxiliary devices 17 are accommodated in the auxiliary device case 46. However, these auxiliary devices do not necessarily have to be accommodated in the auxiliary device case 46.

The technical concept and the advantages understood from the above embodiment will be described below.

The fuel cell system 10 includes the fuel cell stack 12, the hydrogen gas system auxiliary device 15 disposed outside the fuel cell stack 12, and the air system auxiliary device 17 disposed adjacent to the hydrogen gas system auxiliary device 15. The hydrogen gas system auxiliary device 15 includes the injector 64, the upstream side auxiliary device 80 provided on the upstream side of the injector 64 in the flow direction of the hydrogen gas, and the downstream side auxiliary device 82 provided on the downstream side of the injector 64 in the flow direction of the hydrogen gas. The upstream side auxiliary device 80 is disposed at a position farther away from the air system auxiliary device 17 than the downstream side auxiliary device 82.

In the fuel cell system 10, the upstream side auxiliary device 80 is disposed at a position farther away from the air system auxiliary device 17 than the downstream side auxiliary device 82. Therefore, when the air system auxiliary device 17 receives a large load toward the hydrogen gas system auxiliary device 15, the air system auxiliary device 17 is initially brought into contact with the injector 64 or the downstream side auxiliary device 82. Therefore, it is possible to suitably protect the upstream side auxiliary device 80 having a pressure of hydrogen gas that is higher than a pressure of hydrogen gas in the downstream side auxiliary device 82. That is, even if the fuel cell system 10 receives a large load, it is possible to suppress damage on the upstream side auxiliary device 80.

Further, the upstream side auxiliary device 80 at least includes the heat exchanger 62. Thus, even if the fuel cell system 10 receives a large load, it is possible to protect the heat exchanger 62. It should be noted that attachment of the heat exchanger 62 (or the silencer 70) may be omitted.

Further, the air system auxiliary device 17 includes the humidifier 88 configured to humidify air to be supplied to the fuel cell stack 12, and the adjacent part 90 of the humidifier 88 that is the closest to the hydrogen gas system auxiliary device 15 faces the downstream part 64a of the injector 64. In the structure, in the fuel cell system 10, when the humidifier 88 receives a large load toward the hydrogen gas system auxiliary device 15 and movement of the humidifier 88 occurs, the humidifier 88 is brought into contact with the downstream part 64a of the injector 64, and it is possible to absorb energy in the downstream part 64a of the injector 64. Accordingly, it becomes possible to protect the upstream side auxiliary device 80 more suitably.

Further, the upstream side auxiliary device 80 is disposed above the humidifier 88 in the gravity direction. Therefore, in the fuel cell system 10, it is possible to more reliably prevent the humidifier 88 from being brought into contact with the upstream side auxiliary device 80.

Further, the upstream side auxiliary device 80 includes the pipe unit 72 configured to connect the injector 64 and the pipe (hydrogen gas supply pipe 52) as a passage of the hydrogen gas. The injector 64 includes the flange 78 coupled to the pipe unit 72, and the flange 78 faces the adjacent part 90. Therefore, in the fuel cell system 10, when the humidifier 88 moves, the humidifier 88 is brought into contact with the flange 78. Therefore, it is possible to protect the hydrogen gas system auxiliary device 15.

Further, the fuel cell system further includes an auxiliary device case 46 configured to accommodate the upstream side auxiliary device 80, the injector 64, and the downstream side auxiliary device 82. The upstream side auxiliary device 80 includes a joint mechanism 60 coupled to the auxiliary device case 46. The joint mechanism 60 is disposed at a position farther away from the air system auxiliary device 17 than the injector 64. In the structure, when the air system auxiliary device 17 receives a large load toward the hydrogen gas system auxiliary device 15, it is possible to significantly reduce the possibility that the air system auxiliary device 17 contacts the joint mechanism 60, and avoid outflow (leakage) of the hydrogen gas which may otherwise be caused by the damage of the joint mechanism 60.

Further, the upstream side auxiliary device 80 includes an upstream side pipe 52a extending between the joint mechanism 60 and the pipe unit 72 in the auxiliary device case 46, and the upstream side pipe 52a is disposed at a position farther away from the air system auxiliary device 17 than the injector 64. In the structure, when the air system auxiliary device 17 receives a large load toward the hydrogen gas system auxiliary device 15, it is possible to significantly reduce the possibility that the air system auxiliary device 17 contacts the upstream side pipe 52a, and to avoid outflow (leakage) of the hydrogen gas due to damage of the upstream side pipe 52a.

Further, the hydrogen gas system auxiliary device 15 includes the upstream side auxiliary device 80, the injector 64, and the downstream side auxiliary device 82, which are arranged in this order from up to down in the gravity direction. Therefore, in the fuel cell system 10, it is possible to easily dispose the air system auxiliary device 17 so as to face the injector 64 and the downstream side auxiliary device 82, and to achieve a structure where the upstream side auxiliary device 80 is spaced away from the air system auxiliary device 17.

What is claimed is:

1. A fuel cell system comprising:
a fuel cell stack;
a hydrogen gas system auxiliary device disposed outside the fuel cell stack; and
an air system auxiliary device disposed adjacent to the hydrogen gas system auxiliary device, the air system auxiliary device comprising a humidifier configured to humidify air to be supplied to the fuel cell stack,
wherein the hydrogen gas system auxiliary device includes an injector, an upstream side auxiliary device provided on an upstream side of the injector in a flow direction of hydrogen gas, and a downstream side auxiliary device provided on a downstream side of the injector in the flow direction of the hydrogen gas, and
wherein the upstream side auxiliary device is disposed at a position farther away from the humidifier than the downstream side auxiliary device,
and wherein an outer surface of the humidifier includes an adjacent part that is situated proximate to the hydrogen gas system auxiliary device, the adjacent part facing the injector.

2. The fuel cell system according to claim 1, wherein the upstream side auxiliary device at least includes a heat exchanger.

3. The fuel cell system according to claim 1, wherein the adjacent part of the humidifier faces a downstream part of the injector.

4. The fuel cell system according to claim 1, wherein the upstream side auxiliary device is disposed above the humidifier in a gravity direction.

5. The fuel cell system according to claim 1, wherein the hydrogen gas system auxiliary device comprises the upstream side auxiliary device, the injector, and the downstream side auxiliary device, which are arranged in this order from up to down in a gravity direction.

6. A fuel cell system comprising:
a fuel cell stack;
a hydrogen gas system auxiliary device disposed outside the fuel cell stack; and
an air system auxiliary device disposed adjacent to the hydrogen gas system auxiliary device,
wherein the hydrogen gas system auxiliary device includes an injector, an upstream side auxiliary device provided on an upstream side of the injector in a flow direction of hydrogen gas, and a downstream side auxiliary device provided on a downstream side of the injector in the flow direction of the hydrogen gas,
wherein the upstream side auxiliary device is disposed at a position farther away from the air system auxiliary device than the downstream side auxiliary device,
the air system auxiliary device includes a humidifier configured to humidify air to be supplied to the fuel cell stack,
an adjacent part of the humidifier that is closest to the hydrogen gas system auxiliary device faces a downstream part of the injector,
wherein the upstream side auxiliary device comprises a pipe unit configured to connect the injector and a pipe as a passage of the hydrogen gas;
the injector includes a flange coupled to the pipe unit; and
the flange faces the adjacent part.

7. The fuel cell system according to claim 6, further comprising an auxiliary device case configured to accommodate the upstream side auxiliary device, the injector, and the downstream side auxiliary device,
wherein the upstream side auxiliary device includes a joint mechanism coupled to the auxiliary device case; and
the joint mechanism is disposed at a position farther away from the air system auxiliary device than the injector.

8. The fuel cell system according to claim 7, wherein the upstream side auxiliary device includes an upstream side pipe extending between the joint mechanism and the pipe unit in the auxiliary device case; and
the upstream side pipe is disposed at a position farther away from the air system auxiliary device than the injector.

* * * * *